(12) United States Patent
Monson et al.

(10) Patent No.: US 6,609,467 B2
(45) Date of Patent: Aug. 26, 2003

(54) ELASTOMER MOUNTED PALLET

(75) Inventors: Robert James Monson, St. Paul, MN (US); Trevor J. McCollough, Minneapolis, MN (US)

(73) Assignee: Lockheed Martin Corp., Bethesda, MD (US)

( * ) Notice: Subject to any disclaimer, the term of this patent is extended or adjusted under 35 U.S.C. 154(b) by 0 days.

(21) Appl. No.: 09/938,128

(22) Filed: Aug. 23, 2001

(65) Prior Publication Data

US 2003/0037710 A1 Feb. 27, 2003

(51) Int. Cl.[7] ............................................... B65D 19/38
(52) U.S. Cl. ................................................ 108/57.12
(58) Field of Search ..................... 108/57.12, 51.11; 248/560, 562, 615, 638

(56) References Cited

U.S. PATENT DOCUMENTS

| | | | | |
|---|---|---|---|---|
| 3,251,322 A | * | 5/1966 | Downs et al. | |
| 3,275,131 A | * | 9/1966 | Erickson | |
| 5,195,439 A | * | 3/1993 | Harder | |
| 5,588,371 A | * | 12/1996 | Looker | |
| 6,164,405 A | * | 12/2000 | Sakata | |
| 6,343,782 B1 | * | 2/2002 | Honlinger et al. | |

FOREIGN PATENT DOCUMENTS

JP      2-271126    * 6/1990

* cited by examiner

Primary Examiner—Jose V. Chen
(74) Attorney, Agent, or Firm—Patrick M. Hogan; Glenn W. Bowen

(57) ABSTRACT

A pallet for use in loading, storage and transportation of shock sensitive equipment with the pallet including an upper member supported in a spaced condition from a lower member to form pockets for fork lifts or the like with the upper member isolated from the lower member by a set of elastomer mounts that react to external compressive forces thereon by internal shearing resistance rather than compression resistance with the edge of support member spaced laterally from the edges the lower member to inhibit the upper members from contacting each other when one pallets are positioned adjacent to each other and are subject to shock or vibration.

15 Claims, 1 Drawing Sheet

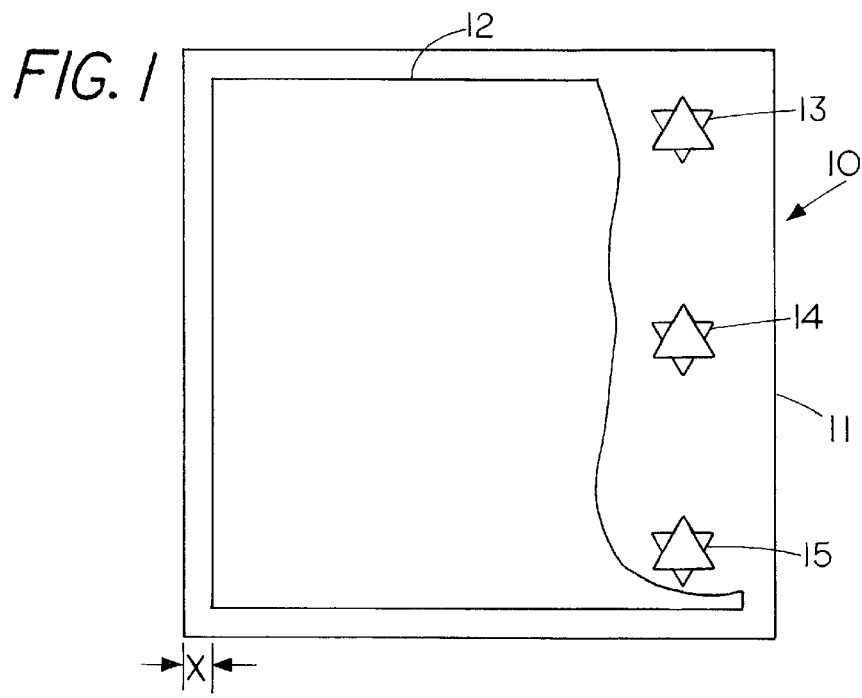
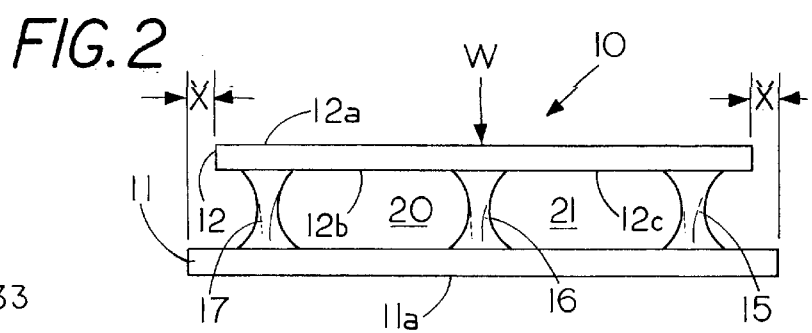
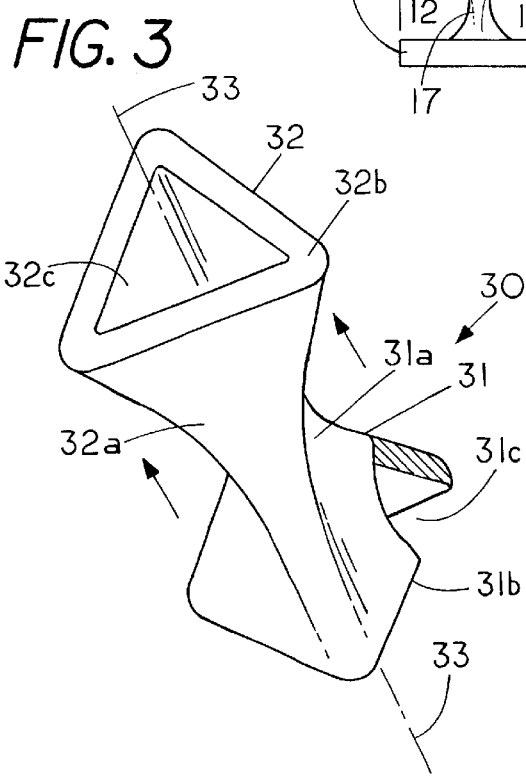

ELASTOMER MOUNTED PALLET

FIELD OF THE INVENTION

This invention relates generally to shock isolated pallets and, more specifically, to a pallet for supporting and protecting equipment thereon from harmful shock and vibration forces with a set of elastomer mounts which are subject to an external compression force but are configured to provide internal shear resistance rather than internal compression resistance.

CROSS REFERENCE TO RELATED APPLICATIONS

None.

STATEMENT REGARDING FEDERALLY SPONSORED RESEARCH OR DEVELOPMENT

None

REFERENCE TO A MICROFICHE APPENDIX

None

BACKGROUND OF THE INVENTION

One of the difficulties in transporting sensitive and fragile equipment from one location to another is that the equipment can be damaged by the normal jostling encountered in loading, unloading or transportation from one location to another. The present invention comprises a pallet that includes elastomer mounts that provide enhanced protection from shock or vibration forces for the equipment on the pallet during the loading, unloading or transportation of the equipment.

Various elastomeric materials have been used, or suggested for use, to provide shock and/or vibration damping as stated in U.S. Pat. No. 5,766,720, which issued on Jun. 16, 1998 to Yamagisht, et al. These materials include natural rubbers and synthetic resins such as polyvinyl chlorides, polyurethane, polyamides polystyrenes, copolymerized polyvinyl chlorides, and poloyolefine synthetic rubbers as well as synthetic materials such as urethane, EPDM, styrene-butadiene rubbers, nitrites, isoprene, chloroprenes, propylene, and silicones. The particular type of elastomeric material is not critical but urethane material sold under the trademark Sorbothane® is currently employed. Suitable material is also sold by Aero E.A.R. Specialty Composites, as Isoloss VL. The registrant of the mark Sorbothane® for urethane material is the Hamiltion Kent Manufacturing Company (Registration No. 1,208,333), Kent, Ohio 44240.

One of the ways to protect equipment on pallets is to have the pallet coupled with an air ride suspension or other compressive support. Although compressive supports are widely used the elastomer mounts of the present invention provide greater shock and vibration absorption since they resist external compression forces by an internal shearing action rather than an internal material compression. The present invention provides for improved pallet support by allowing one to place the elastomer mounts between upper and lower members of the pallet such that when the elastomers are subject to an external compressive force the material in the elastomer is placed in shear rather than in compression thereby providing enhanced shock and vibration absorption.

SUMMARY OF THE INVENTION

A pallet to absorb shock and vibration energy comprising a first member and a second member spaced sufficiently far apart to allow a fork lift extension therebetween with a set of elastomer mounts spaced between the first member and the second member so as separate the upper member from the lower member and to provide pockets for insertion of the fork lift arms therein with the elastomer mount configured to provide internal shear resistance to an external static or dynamic compressive force. The pallet effectively damps shock and vibration forces on an article resting on the pallet while simultaneously supporting the weight of the article on the pallet.

BRIEF DESCRIPTION OF THE DRAWINGS

FIG. 1 is a top view of a pallet with a portion of the one of the members cut away to reveal the triad elastomer used with the present invention;

FIG. 2 is a side view of the pallet of FIG. 1 showing the pockets for the fork lift arms extending between rows of elastomer mounts separating the top member from the bottom member; and FIG. 3 is the perspective view of a double triad elastomer used in the pallet of FIG. 1.

DESCRIPTION OF THE PREFERRED EMBODIMENTS

FIG. 1 shows a partial cut away top view of a pallet 10 having a lower rigid plate member 11 positioned below a second rigid plate member 12. Extending between rigid plate member 11 and rigid plate member 12 is a first row of triad elastomers with three of the triad elastomers 13, 14 and 15 visible. The triad elastomers are more fully described in copending application titled Double Triad Elastomer Mount filed Feb. 8, 2001, Ser. No. 09/779,423 which is herein incorporated by reference. A feature of the triad elastomers is that the elastomer are configured so that an external compressive forces on opposite ends of the triad elastomer produce an internal shearing action within the elastomer mount rather than an internal compression of the material. The result is that the elastomer mounts, respond to compressive loads in a shear mode rather than a compression mode. By utilizing elastomer mounts that are mounted in shear rather than in compression one can provide more effective damping of shock and vibration forces.

FIG. 2 is a side view showing pallet 10 comprise a lower member 11 having a surface 11a which generally rests on a floor when the pallet is not in transit. Located in a spaced parallel condition from lower member 11 is upper member 12. Upper member 12 is held in a spaced condition by three rows of elastomers. That is, elastomer 15, elastomer 16 and elastomer 17 are in alignment with other elastomers located therebehind to produce three rows of elastomers. The spacing of the rows of elastomers from each other produces a set of pockets for extending of the arms of a fork lift therebetween. That is, elastomer row 15 and 16 form an elongated pocket 21 for extension of a fork lift arm therein to enable the fork lift arm to engage the underside 12c of member 12. Similarly, elastomer row 16 and 17 form an elongated pocket 20 for extension of a fork lift arm therein to enable the fork lift arm to engage the underside 12c of member 12. Thus the pallet 10 contains two elongated pockets for inserting the lift arms of a conventional fork lift.

Member 10 includes a top surface 12a for placing the sensitive equipment thereon during transportation of same from place to place. A view of FIG. 1 and FIG. 2 reveals that upper member 10 is smaller than lower member 11 with each edge of upper member 10 spaced from the edge of the corresponding lower member by a distance x. The purpose of having the bottom member larger than the top is to ensure that when the pallets are positioned adjacent to each other that the top members are not sufficiently close so as to bump each other if a shock or vibration is encountered. Thus the distance x will be dependent on a number of factors but will be greater than the displacement encountered from either a static load or the combination of a static and dynamic load. This ensures that the elastomer mounts can effectively damp the shock and vibration forces without encountered lateral forces due to contact with adjacent pallets.

Instead of making the top pallet smaller than the other a set of spacers could be used in connection with the lower pallet member to assure that the lower pallet member 11 remains a fixed distance away from an adjacent pallet.

FIG. 3 illustrates one of the double triad elastomer that are configured to provide the sole compressive support between plate member 11 and plate member 12. With the pallet 10 located in the position shown in FIG. 2 the weight of the article acts downward as indicated by force arrow W thereby inducing a sheer force to each of the triad elastomers connecting member 11 to member 12. In the embodiment shown the shear resistance within the elastomer mounts absorbs the static weight of the article on pallet 10. In addition the elastomer mounts, which are subject to external shock and vibration forces, utilize the internal shear resistance of the elastomer mounts rather than the compressive resistance of the elastomer to absorb energy from shock and vibration forces.

FIG. 3 shows a pictorial view of a triad elastomer mount or single isolator 30 for providing shock and vibration attenuation while providing axially offset support. Isolator 30 is a two-tetrahedron shock isolator 30 for simultaneously isolating shocks and for supporting a static load in a shear mode rather than a compression mode. Tetrahedron shock isolator 30 comprises an elastomer material, having a set of integral side walls forming a first tetrahedron isolator 31 with a tetrahedron shaped cavity 31c therein and a second tetrahedron shock isolator 32 with a tetrahedron shaped cavity 32c therein. A central axis 33 is shown extending through an apex end 32a and an apex end 31a Apex end 31a and apex end 32a are smoothly joined to each other to form a one-piece two-tetrahedron shock isolator. The top tetrahedron isolator 32 has a triangular shaped base end for forming a first support surface 32b. Similarly, the bottom tetrahedron isolator 31 has a triangular shaped base end for forming a second support surface 31b. The conjunction of the two-tetrahedron isolator provides an integral force transfer region with both the triangular shaped base ends 31a and 32a of the two-tetrahedron isolator 31 and 32 laterally offset with respect to the minimum cross-sectional area which occurs at the apex conjunction of the tetrahedron shock isolator 31 and 32. That is, a line parallel to axis 33 that extends through first support surface 32b does not extend through the conjoined region between the apex of the two-tetrahedron isolators 31 and 32. Similarly, a line parallel to axis 33 that extends through the second support surface 31b does not extend through the conjoined region between the two apexes of the two-tetrahedron isolators 31 and 32. As can be seen from FIG. 3 the support surface 32b even though identical in shape 31b are rotationally displaced from each other as well as laterally displaced from each other so external compressive forces on the ends of elastomer mount 30 do not produce internal compression resistance in elastomer mount 30 but instead produce internal shear resistance which can effectively damp shock and vibration forces.

We claim:

1. A pallet for storing and transporting an article comprising:

an upper member;

a lower member; and a plurality of laterally spaced apart elastomers configured to provide internal shear resistance in response to a compressive force, each of said elastomers having a first end secured to the upper member and a second end secured to the lower member to support a shock sensitive article on the upper member while holding the upper member in a spaced distance from the lower member to allow the elastomers to both support the weight of the load as well as attenuate shock and vibrations.

2. The pallet of claim 1 wherein the elastomers have a minimum cross sectional area that is parallel to an end surface of the elastomer but the minimum cross sectional area is positioned laterally of the end surface to preclude an internal compression resistance of the elastomer when the elastomer is compressed between the upper member and the lower member.

3. The pallet of claim 2 wherein the lower member is rigid and the upper member and lower member are spaced sufficiently far apart to prevent contact between the members when the upper members is subject to a shock force or a vibration force.

4. The pallet of claim 1 wherein the upper member is smaller than the lower member with an edge of the upper member spaced sufficiently inward from an edge of a lower member so that when pallets are positioned adjacent to each other the pallets upper members do not contact each other when the pallet is subject to shock or vibration forces.

5. The pallet of claim 1 wherein the upper member has a set of edges and the lower member has a set of edges with each of the set of edges of the upper member inwardly displaced from a corresponding edge on a lower member.

6. The pallet of claim 1 including at least 3 rows of elastomer mounts with adjacent rows spaced from each other to provide a pocket for insertion of a fork lift arm.

7. The pallet of claim 1 wherein the elastomer mounts are adhesively secured to the upper member and the lower member.

8. The pallet of claim 1 wherein the elastomer mounts comprise the sole support for the upper member.

9. A method of isolating an article from shock during either loading, transportation or storage comprising:

securing a first end of a first set of elastomer mounts to a surface of an upper member and a second end of the first set of elastomer mounts to a surface of a lower member to place the elastomer mounts in internal shear resistance mode;

laterally securing a first end of second set of elastomer mounts to the surface of an upper member and a second end of the second set of elastomer mounts to the surface of a lower member to provide a pocket therebetween with each of the elastomer mounts providing vibration and shock damping solely through shear resistance of the elastomer mount.

10. The method of claim 9 including the step mounting at least three rows of elastomer mounts between the upper and lower members.

11. The method of claim 10 wherein the upper member is formed with a flat surface for supporting a shock sensitive article thereon.

12. The method of claim 11 wherein the step of securing the elastomer mounts comprises adhesively securing the elastomer mounts to each of the upper and lower members.

13. A pallet for simultaneously isolating shocks and for supporting a static load comprising:

a set of elastomers each of said elastomers mounted in a shear mode and having a one end secured to a lower member and an other end secured to an upper member with the upper member for supporting a static weight of equipment in a spaced condition above the lower member and at sufficient distance to avoid direct contact between the upper member and the lower member, said set of elastomers simultaneously supporting a weight of an article on the upper member and isolating the article from shock and vibration forces through internal shear resistance of the elastomers rather than internal compression resistance of the elastomers.

14. The pallet of claim 13 wherein the elastomers comprise the sole support for the between the upper member and the lower member.

15. The pallet of claim 13 wherein the elastomer mount comprises:

a set of side walls forming a tetrahedron shaped isolator with a cavity therein, said tetrahedron shaped isolator having a central axis and an apex end for forming a first support surface and a base end for forming a second support surface with said first support surface and said second support surface laterally positioned with respect to each other so that a line parallel to said central axis and extending through said first support surface does not extend through said second support surface and vice versa.

* * * * *